(12) United States Patent
Ishikawa et al.

(10) Patent No.: US 6,471,238 B2
(45) Date of Patent: Oct. 29, 2002

(54) AIR-BAG DEVICE AND A METHOD FOR FOLDING AN AIR-BAG

(75) Inventors: Toshihiro Ishikawa, Fuchu-cho (JP); Takeshi Takagi, Fuchu-cho (JP); Kazunori Etou, Minoo (JP); Akinori Koyama, Takatsuki (JP); Kouichi Ishida, Daito (JP)

(73) Assignees: Mazda Motor Corporation, Hiroshima-ken (JP); Ashimori Kogyo Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 09/542,471

(22) Filed: Apr. 4, 2000

(65) Prior Publication Data

US 2002/0093183 A1 Jul. 18, 2002

(30) Foreign Application Priority Data

Apr. 6, 1999 (JP) ............................. 11-098879

(51) Int. Cl.[7] ............................................... B60R 21/20
(52) U.S. Cl. .................. 280/728.3; 280/731; 280/743.1
(58) Field of Search .................... 280/728.1, 728.2, 280/730.1, 731, 732, 743.1, 728.3; 493/405, 243, 458, 940

(56) References Cited

U.S. PATENT DOCUMENTS

| | | | |
|---|---|---|---|
| 4,004,828 A | * 1/1977 | Sogabe et al. | 280/743.1 |
| 5,143,401 A | * 9/1992 | Zushi | 280/728.3 |
| 5,162,035 A | * 11/1992 | Baker | 280/743.1 |
| 5,324,070 A | * 6/1994 | Kitagawa et al. | 280/730.1 |
| 5,338,060 A | * 8/1994 | Soderquist | 280/728.3 |
| 5,364,126 A | * 11/1994 | Kuretake et al. | 280/730.1 |
| 5,681,052 A | 10/1997 | Ricks et al. | |
| 5,810,391 A | * 9/1998 | Werner et al. | 280/731 |
| 5,865,466 A | * 2/1999 | Yamamoto et al. | 280/743.1 |
| 5,868,660 A | * 2/1999 | Yokoyama | 493/940 |
| 6,170,857 B1 | * 1/2001 | Okada et al. | 280/732 |
| 6,176,509 B1 | * 1/2001 | Kawaguchi et al. | 280/728.1 |
| 6,193,271 B1 | * 2/2001 | Shimane | 280/732 |

FOREIGN PATENT DOCUMENTS

| | | |
|---|---|---|
| DE | 25 36933 A1 | 3/1976 |
| JP | 7-277125 | 10/1995 |
| JP | 9-263204 | 10/1997 |

* cited by examiner

Primary Examiner—Brian L. Johnson
Assistant Examiner—Christopher Bottorff
(74) Attorney, Agent, or Firm—Nixon Peabody LLP; Donald R. Studebaker

(57) ABSTRACT

An air-bag 12 is designed to vertically expand after transversely expanding while being inflated. The air-bag 12 having a substantially circular shape is folded from its opposite ends toward its middle along a direction "a" corresponding to vertical direction and rolled in an opposite direction, is then folded in a zigzag manner one fold over another from its opposite ends toward its middle along a direction "b" (transverse direction), and is accommodated in a container casing 14. Accordingly, the inventive air-bag device and air-bag folding method can suppress an inflation (expansion) of the air-bag toward a passenger at an early stage of the inflation of the air-bag, promote a transverse expansion more than a vertical expansion of the air-bag at the early stage of the inflation, and prevent a blow out of a gas toward the passenger.

22 Claims, 19 Drawing Sheets

AIR-BAG DEVICE AND A METHOD FOR FOLDING AN AIR-BAG

The present invention relates to an air-bag device and a method for, folding the air-bag and particularly to a rapid opening performance of the air-bag realized by improving an airbag folding method and a diffusing plate for guiding a blown gas.

BACKGROUND OF THE INVENTION AND RELATED ART STATEMENT

A generally known air-bag device installed in an automotive vehicle is comprised of an inflator (gas generator), an air-bag which is inflated upon the admittance of a gas generated by the inflator thereinto at the time of a crash, a container casing including a cover member made of a synthetic resin for covering the front sides of the inflator and the air-bag. When a crash sensor detects a crash, the inflator is activated to blow the gas to the air-bag to inflate it, thereby tearing the cover member open to expand to a passenger's compartment to protect a passenger.

Generally, an air-bag device for a driver's seat is installed in the middle of a steering wheel. An air-bag having a circular plan view in its inflated state is used for this air-bag device. An inflator and the folded air-bag of this air-bag device are accommodated in a container casing in the middle of a steering wheel while being folded. It should be noted that a steering pad of the steering wheel also serves as a cover member for covering the front sides of the air-bag and the inflator.

On the other hand, an air-bag having a substantially vertically long rectangular front view is used for an air-bag device for a passenger's seat. An inflator and the folded air-bag of this air-bag device are accommodated in a container casing provided in the front or upper surface of a dashboard.

A variety of air-bag devices in which a folding method of an air-bag when the air-bag is to be accommodated in a container casing is devised have been put into practical use.

In the description under the caption "prior art" of the Japanese Unexamined Patent Publication No. 7-277125, a generally known folding method of the air-bag is mentioned. According to this folding method, after being transversely folded in a zigzag manner one fold over another from its opposite ends toward its middle, the air-bag is vertically folded in a zigzag manner one fold over another from its opposite ends.

In the air-bag device disclosed in the above publication, the air-bag is, after being folded first from its opposite ends toward its middle along a first direction and then rolled in an opposite direction (hereinafter, this folding method is referred to as an reverse roll-in method), folded in the reverse roll-in method along a second direction perpendicular to the first direction, and then accommodated in a container casing.

Further, in an air-bag device disclosed in Japanese Unexamined Patent Publication No. 9-263204, an air-bag is, after being folded in a zigzag manner one fold over another from its opposite ends toward its middle along a direction corresponding to a vertical direction in an inflated state of the air-bag, transversely folded in the reverse roll-in method from its left and right ends toward its middle, and is then accommodated in a container casing. This publication also discloses a construction of the air-bag device in which an air-bag is, after being folded in a zigzag manner one fold over another from its opposite ends toward its middle along a direction substantially corresponding to a vertical direction in an inflated state of the air-bag, transversely folded in a zigzag manner one fold over another.

Generally speaking, there are three folding methods of the air-bag: a zigzag folding method according to which the air-bag is vertically or transversely folded in a zigzag manner one fold over another from its opposite sides toward its middle; a roll-in method according to which the air-bag is vertically or transversely rolled in from its opposite sides toward its middle; and a reverse roll-in method according to which the air-bag is vertically or transversely folded first from its opposite ends toward the middle and then rolled in an opposite direction.

The air-bag folded in the zigzag folding method is easy to rapidly inflate, whereas the air-bag folded in the roll-in method or the reverse roll-in method is inflated at a slightly reduced speed. Further, the air-bag folded in the zigzag folding method causes a large impact on the passenger since the air-bag is likely to expand toward the passenger. The air-bag folded in the roll-in method also causes a large impact on the passenger for the same reason.

According to the prior art air-bag folding method disclosed in Japanese Unexamined Patent Publication No. 7-277125 (transversely and vertically folded in a zigzag manner), the air-bag is difficult to rapidly expand to the left and right sides since it is likely to rapidly expand toward the passenger while being inflated. According to another air-bag folding method disclosed in this publication (reverse roll-in method in both first and second directions), it is difficult to speed up the inflation of the air-bag since the air-bag is folded in the reverse roll-in method in both directions.

According to the air-bag folding method disclosed in Japanese Unexamined Patent Publication No. 9-263204 (vertically folded in a zigzag manner and transversely folded in the reverse roll-in method), it is difficult to speed up the inflation of the air-bag at an early stage thereof since the zigzag folds are vertically expanded after the folds made in the reverse roll-in method are transversely expanded. According to another air-bag folding method disclosed in this publication (vertically and transversely folded in a zigzag manner), although the inflation to the left and right sides can be slightly speeded up, it is difficult to sufficiently speed up the transverse inflation of the air-bag since the air-bag is likely to expand toward the passenger.

It is an object of the present invention to suppress an inflation (expansion) of an air-bag of an air-bag device toward a passenger at an early stage of the inflation, to promote a transverse inflation of the air-bag more than a vertical inflation thereof at an early stage of the inflation, and to restrict a blow out of a gas toward the passenger.

BRIEF SUMMARY OF THE INVENTION

In order to fulfill the above object according to this invention, an air-bag device, comprises an inflator; an air-bag to be inflated by a gas supplied from the inflator; and a cover member adapted for covering front sides of the inflator and the air-bag and to be split open upon inflation of the air-bag, said air-bag is accommodated under the cover member in such a folded state that: opposite ends of the air-bag along a first axis are folded towards its middle along the first axis and are rolled in a direction opposite to the folding direction along the first axis, and opposite ends of the air-bag along a second axis, perpendicular to the first axis, are folded in a zigzag manner one fold over another along the second axis.

These and other objects, features and advantages of the present invention will become more apparent upon a reading of the following detailed description and accompanying drawings.

BRIEF DESCRIPTION OF THE DRAWINGS

FIGS. 9A through 11C are diagrams showing how the air-bag is folded step by step from the fully extended state to the fully folded state which is ready to be accommodated under the cover member, FIGS. 9A and 9B are diagrams showing how the air-bag is folded along the first direction (axis) in a first step, FIGS. 11A through 11C are diagrams showing how the air-bag is folded along the second direction (axis) as a third step after completion of the second step.

DETAILED DESCRIPTION OF THE PREFERRED EMBODIMENTS OF THE INVENTION

Hereinafter, one embodiment of the invention is described with reference to the accompanying drawings.

In this embodiment, the invention is applied to an air-bag device for a driver's seat, which is installed in a steering wheel of an automotive vehicle, and an air-bag device for a passenger's seat, which is installed in a dashboard. It should be noted that a front side throughout the following description is based on FIG. 2.

Figure 1:
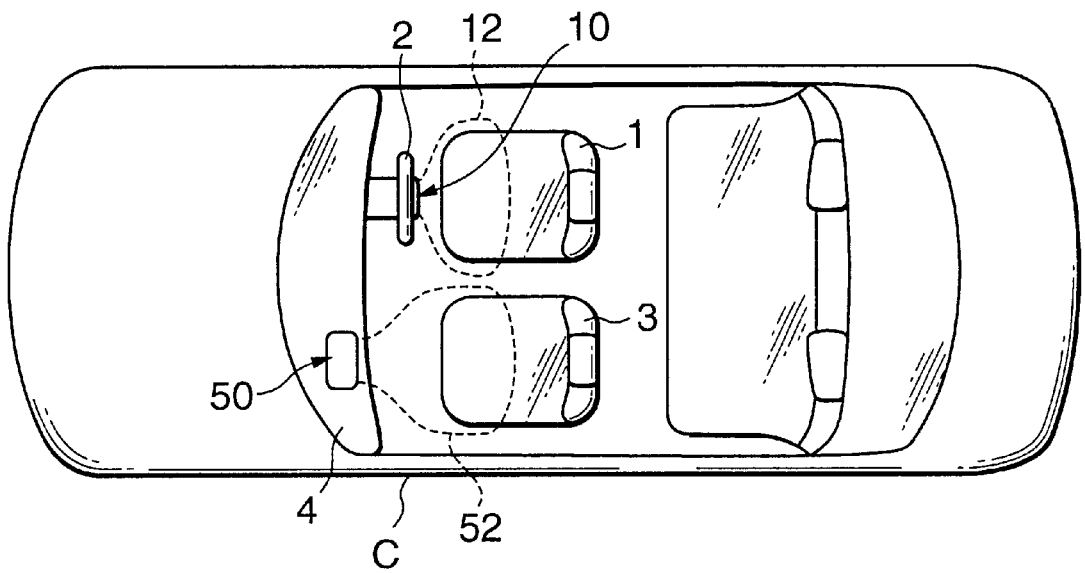
FIG. 1 is a schematic plan view of an automotive vehicle according to one embodiment of the invention.
Figure 2:
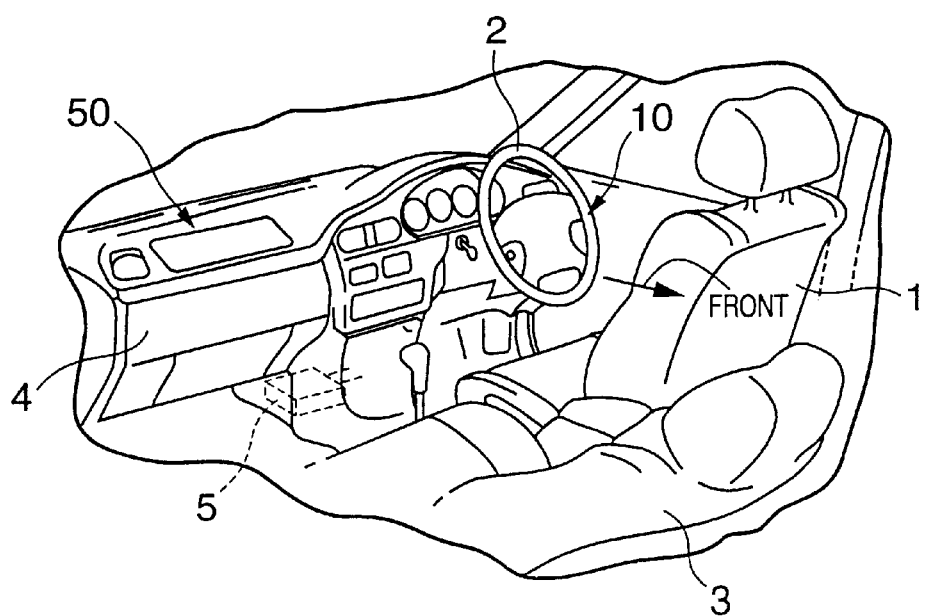
FIG. 2 is a perspective view showing an essential portion of the automotive vehicle when viewed from a passenger's compartment side.

As shown in FIGS. 1 and 2, in an automotive vehicle C, an air-bag device 10 for a driver's seat is installed in a steering wheel 2 provided in front of a driver's seat 1; an air-bag device 5 for a passenger's seat is installed in a dashboard 4 in front of a passenger's seat 3; and a control box 5 commonly used for the two air-bag device 10 and 50 is provided in a lower portion of the dashboard 4. It should be noted that air-bags 12 and 52 of the air-bag devices 10 and 50 are shown in their inflated states by dashed line in FIG. 1.

First, the air-bag device 10 for the driver's seat 1 is described.

Figure 3:
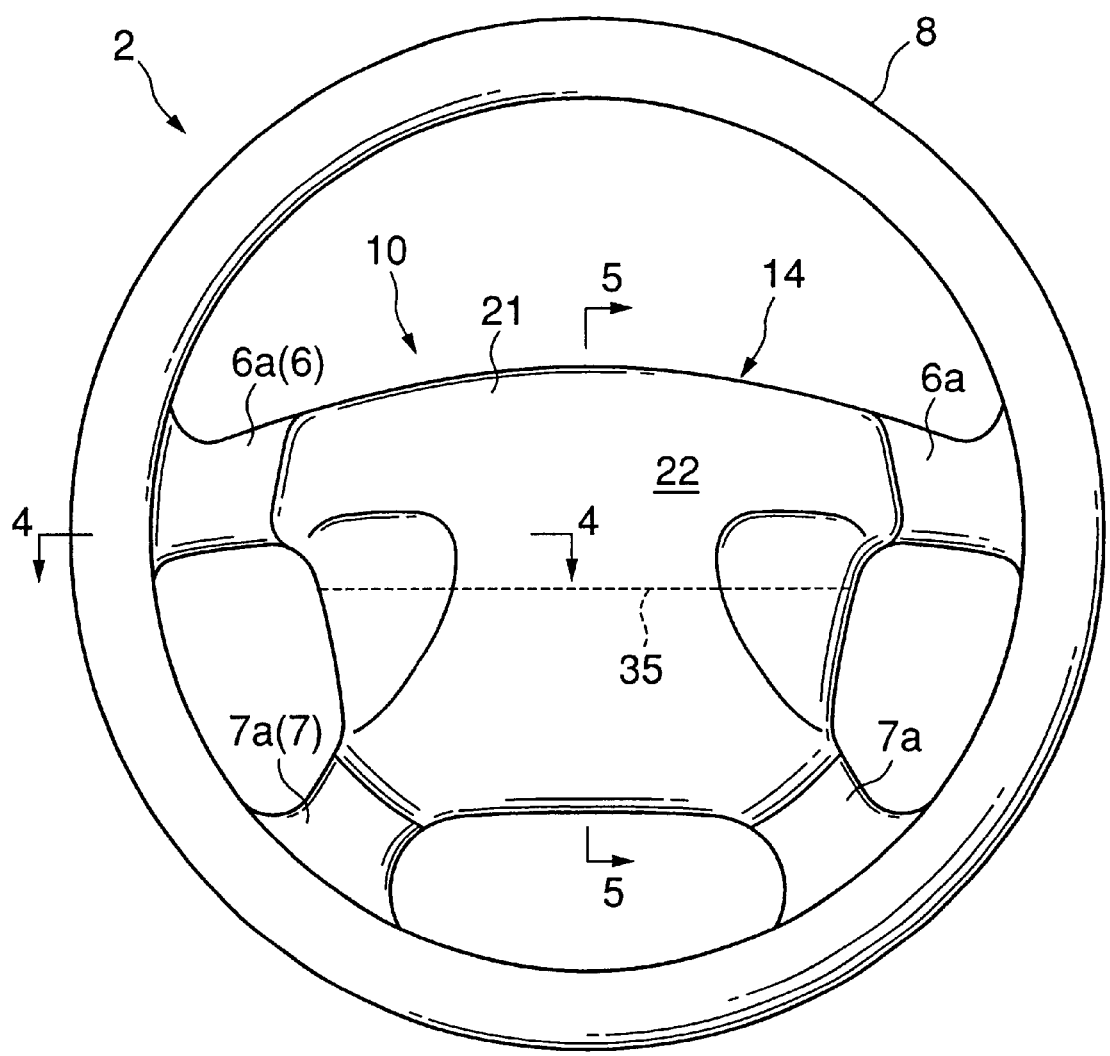
FIG. 3 is a plant view of a steering wheel equipped with an air-bag device.
Figure 4:
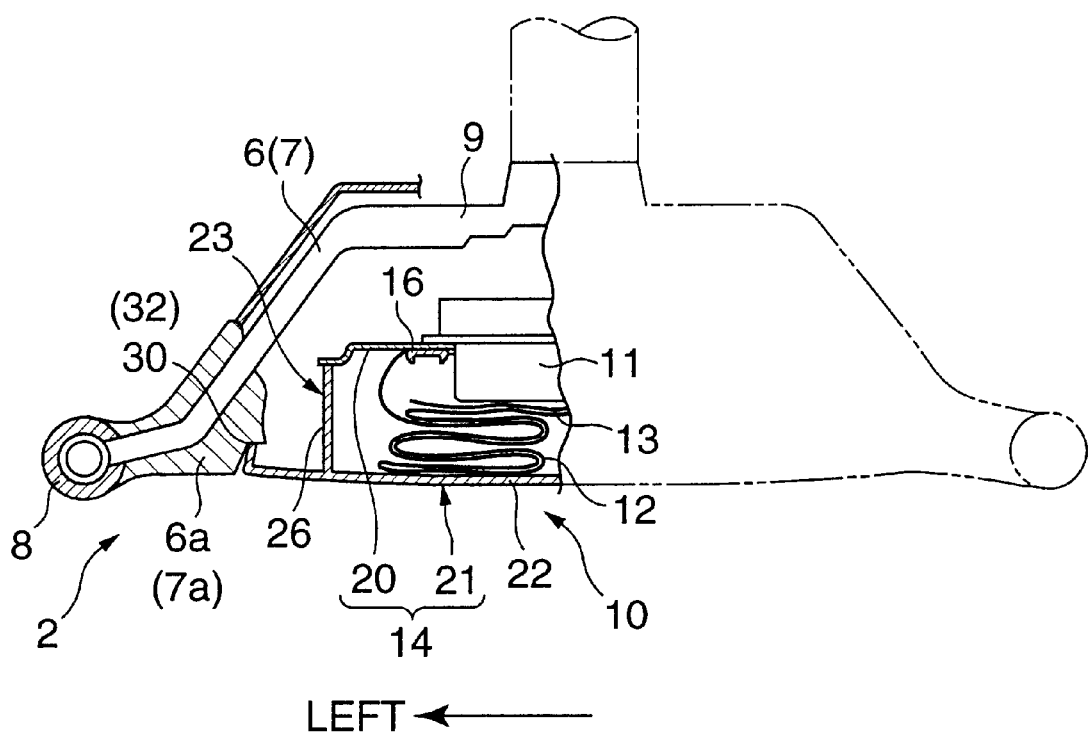
FIG. 4 is a section along 4—4 of FIG. 3.

As shown in FIGS. 3 and 4, the steering wheel 2 is comprised of a bottom wall portion 9 coupled to a steering shaft, four steering spokes 6 and 7, and a wheel main body 8, and the air-bag device 10 for the driver's seat is provided in an area enclosed by the bottom wall portion 9, the steering spokes 6 and 7, and the wheel main body 8, and a cover member 21 of this air-bag device 10 serves also as a steering pad. The steering spokes 6 and 7 include spoke main bodies 6b, 7b and covering portions 6a, 7a for covering the leading ends of the spoke main bodies 6b, 7b.

Figure 5:
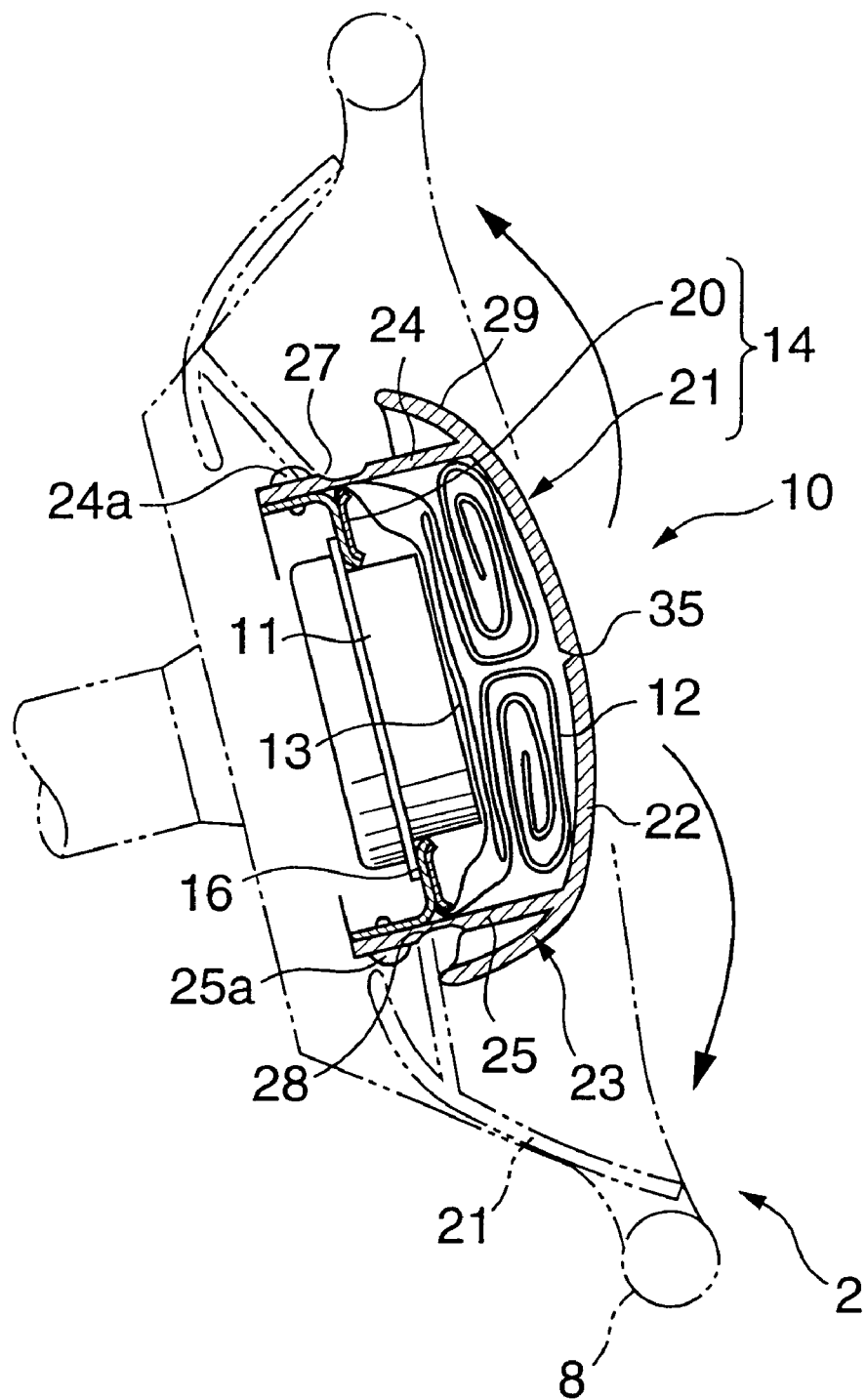
FIG. 5 is a section along 5—5 of FIG. 3.
Figure 6:
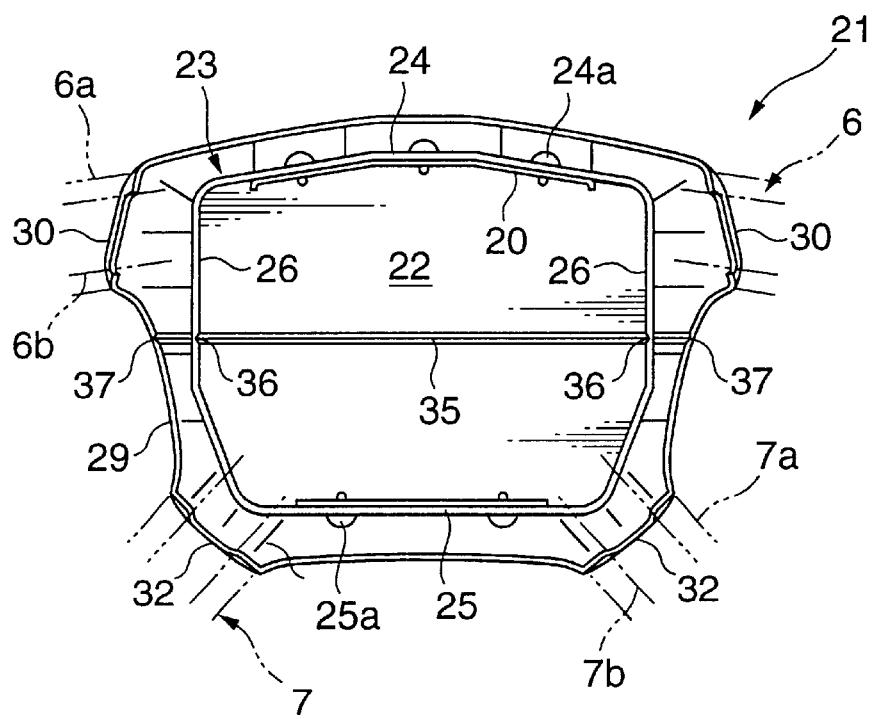
FIG. 6 is a bottom view of a cover member of the air-bag device.
Figure 7:
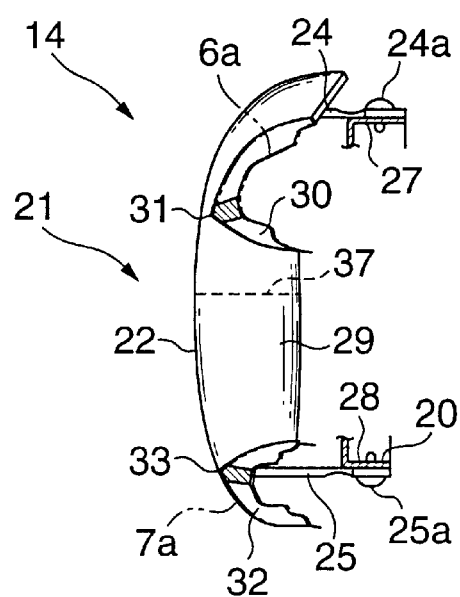
FIG. 7 is a side view of the cover member.
Figure 8:
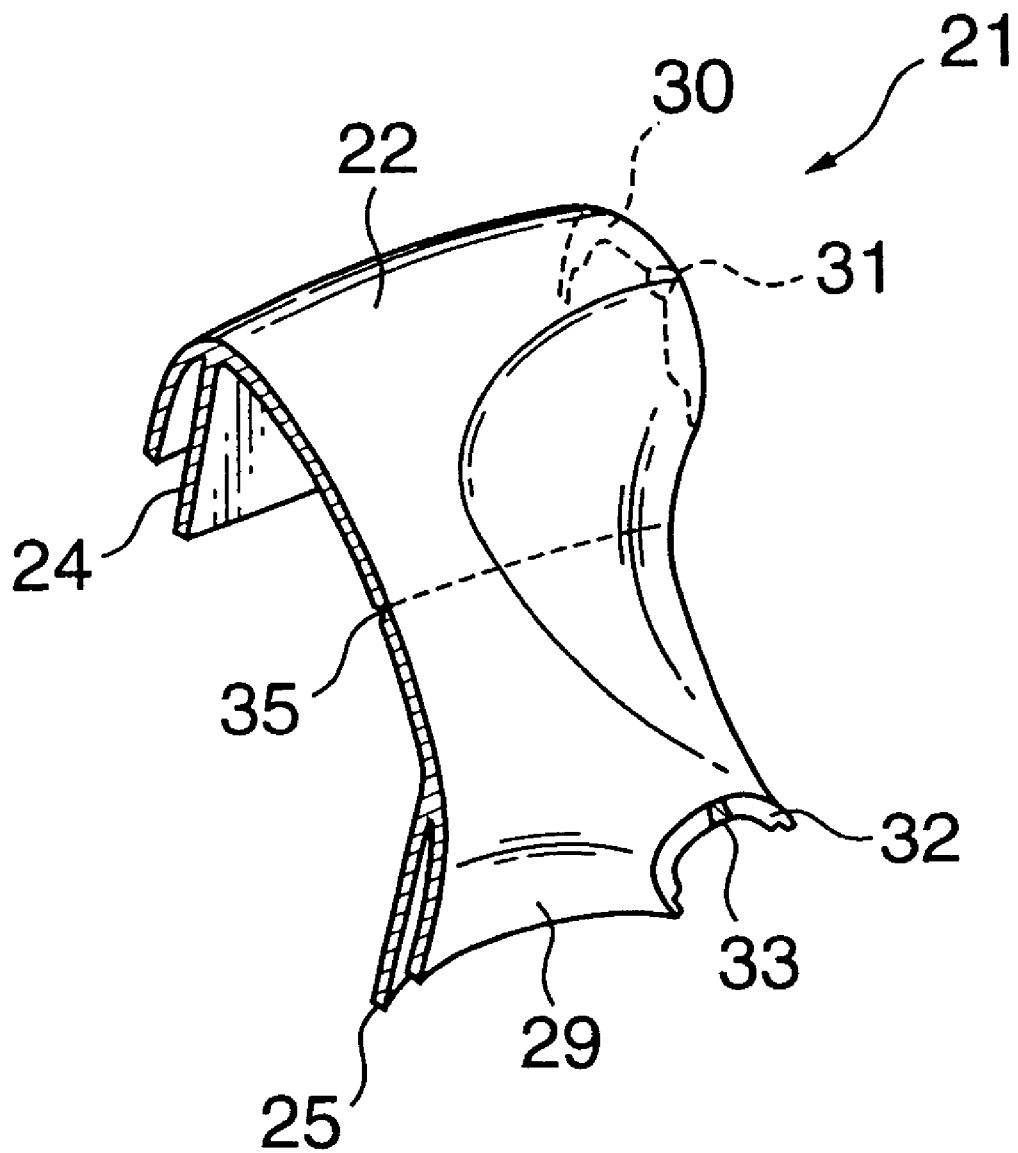
FIG. 8 is a perspective view partly in section of the cover member.

As shown in FIGS. 4 and 5, the air-bag device 10 is provided with an inflator 11, an air-bag 12 which is inflated by a gas supplied from the inflator 11, a diffuser 13 (diffusing member) for transversely guiding (diffusing) the gas blown from the inflator 11, and a container casing 14 for accommodating the inflator 11, the air-bag 12 and the diffuser 13.

The container casing 14 is comprised of a metal mount plate 20 fixedly mounted on the steering wheel 2, and a single cover member 21 made of a synthetic resin which covers the front surface and the outer circumferential surface of the air-bag 12 and is split vertically open when the air-bag 12 is expanded, thereby opening the container casing 14 transversely and vertically.

As shown in FIGS. 4 to 8, the cover member 21 includes a front wall portion 22 for covering the front surface and the outer circumferential surface of the air-bag 12, and a surrounding wall portion 23 continuously formed with the front wall portion 22. The surrounding wall portion 23 is comprised of a pair of vertically spaced connecting walls 24, 25 having their base ends connected with the mount plate 20 (corresponding to a fixing member) to fix the inflator 11, a pair of transversely spaced side walls 26, and hinges 27, 28 which are provided near the base ends of the connecting walls 24, 25 and serve as pivots when the cover member 21 is split open.

The base end of the upper connecting wall 24 is connected to a substantially horizontal upper surface of the mount plate 20 by a plurality of (3) rivets 24a, whereas the base end of the lower connecting wall 25 is connected to a substantially horizontal lower surface of the mount plate 20 by a plurality of (2) rivets 25a. The based ends of the side walls 26 are held in contact with the front surface of the mount plate 20, respectively. The hinges 27, 28 are formed, for example, by thinning portions of the connecting walls 24, 25 immediately before the rivets 24a, 25a so that the upper and lower split sections of the cover member 21 can be bent upward and downward at the positions of the rivets 24a, 25a, respectively.

Further, the cover member 21 has a second surrounding wall 29, which is continuous with the outer surface of the front wall 22. This second surrounding wall 29 is provided with four engaging portions 30, 32 engageable with the inner ends of the synthetic resin covering portions 6a, 7b of the four steering spokes 6, 7 (see FIGS. 4 and 7), and thinned portions 31, 33 which serve as interference easing portions for easing the interference of the engaging portions 30, 32 with the covering portions 6a, 7a when the cover member 21 is split open. The engaging portions 30, 32 are formed into recesses which are engageable with the covering portions 6a, 7a from the front side without causing any shake, and the thinned portions 31, 33 are formed at the front ends of the engaging portions 30, 32.

A splitting line 35 transversely extends in middle of the front wall 22 of the cover member 21 with respect to vertical direction; a pair of splitting lines 36 continuous with the splitting line 35 are so formed in the pair of side walls 26 as to extend along forward/backward directions; and a pair of splitting lines 37 are formed in the second surrounding wall 29 in a position corresponding to the splitting lines 36 with respect to vertical direction and extend substantially along forward/backward directions. While the air-bag 12 is inflated, the cover member 21 is split vertically open along these splitting lines 35 to 37, and the split sections of the cover member 21 pivot about the upper and lower hinges 27, 28. It should be noted that the splitting lines 35 to 37 are realized by forming grooves in the inner surface of the cover member 21.

Figure 13:
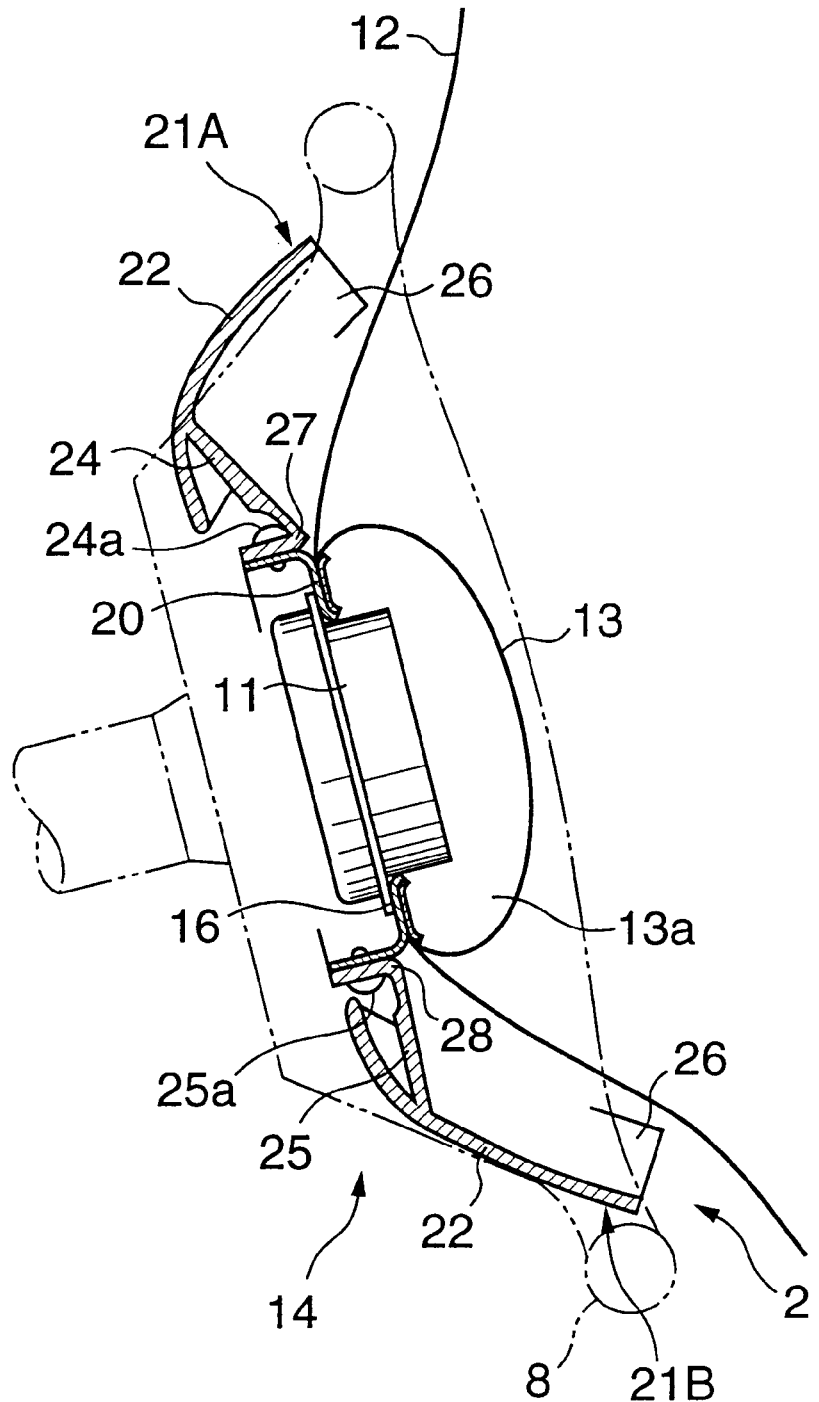
FIG. 13 is a vertical section of the air-bag device (inflated state)

FIG. 13 shows a state where the cover member 21 is split vertically open while the air-bag 12 is being inflated, thereby rotating an upper cover section 21A by about 120° about the hinge 27 and rotating a lower cover section 21B by about 90° about the hinge 28, so that an area where the air-bag 12 is accommodated is substantially completely open or exposed with respect to transverse and vertical directions.

The inflator 11 is, for example, constructed such that a gas generating agent is contained in a tubular case, and a base end thereof is airtightly mounted on the mount plate 20. When the control box 5 detects a crash of the vehicle, power is applied to the inflator 11 from a driver of the control box 5, causing a reaction of the gas generating agent to generate a gas for inflating the air-bag 12. It should be noted that a plurality of gas openings (not shown) through which the generated gas is blown are formed in the outer wall of the tubular casing.

The air-bag 12 is formed by sewing the outer edges of a pair of substantially circular fabric materials together, and a base end thereof is tightly held between the mount plate 20 and a pressing plate 16 together with the diffuser 13. In this state, the air-bag 12 and the diffuser 13 are folded and accommodated in the container casing 14.

Hereinafter, how the air-bag 12 is folded is described with reference to FIGS. 9A to 11C. The air-bag 12 is designed to vertically expand after transversely expanding when being inflated.

Figure 9A:
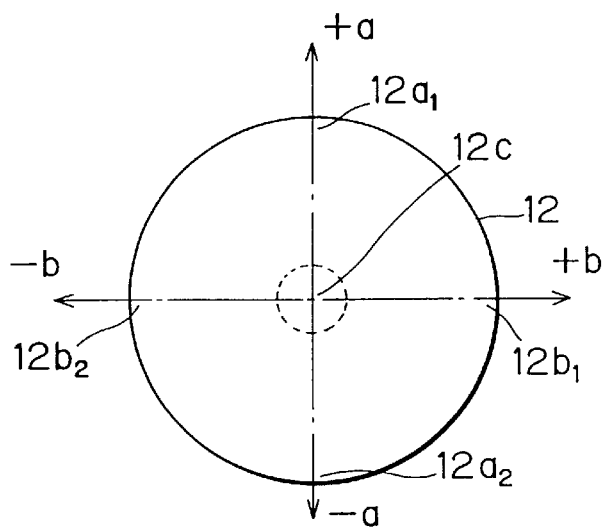
Figure 9B:
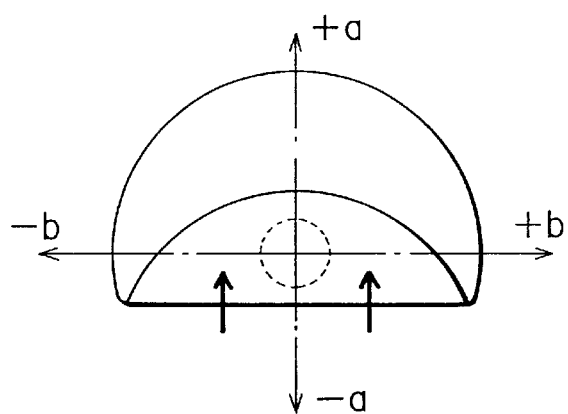
Figure 10A:
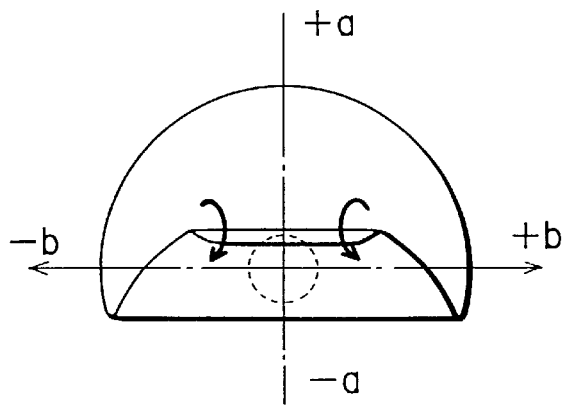
FIGS. 10A and 10B are diagrams showing how the air-bag is rolled along the first direction (axis) as a second step after completion of the first step.
Figure 10B:
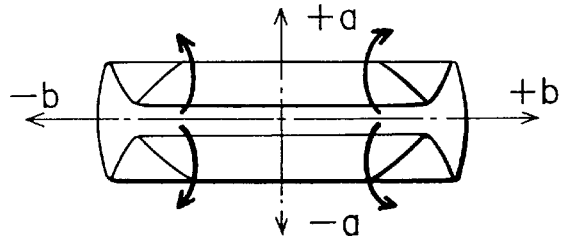
Figure 11A:
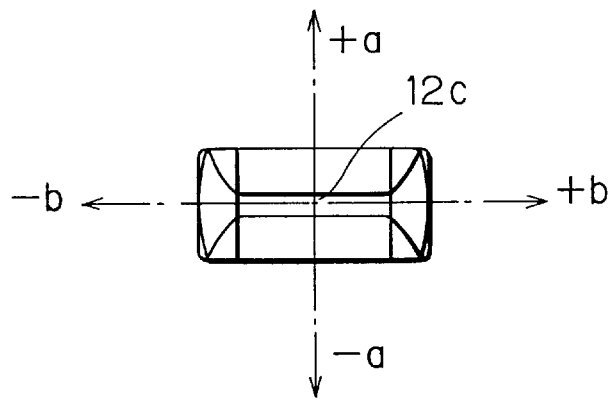
Figure 11B:
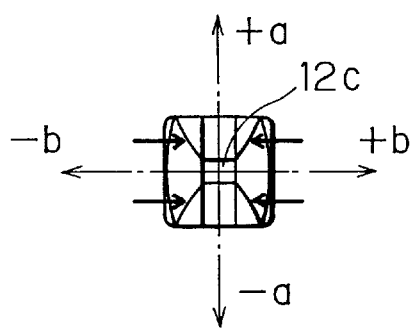
Figure 11C:
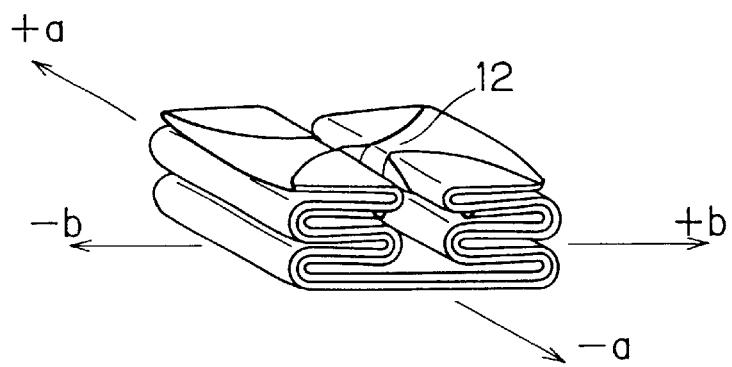

A substantially circular air-bag is accommodated under the cover in such a folded state as shown in FIG. 11C. First opposite ends 12a1, 12a2 of the air-bag 12 along a first axis "a" (corresponding to upward "+a" and downward "−a" directions in FIGS. 9 to 11) are folded towards its middle 12c along the first axis "a" as shown in FIGS. 9A and 9B.

Then the opposite ends 12a1, 12a2 of the air-bag 12 are rolled in a direction opposite to the folding direction along the first axis "a" as shown in FIGS. 10A, 10B.

And then another opposite ends 12b1, 12b2 of the air-bag 12 along a second axis "b" (corresponding to leftward "−b" and rightward "+b" directions in FIGS. 9–11), perpendicular to the first axis "a", are folded in a zigzag manner one fold over another towards its middle 12c along the second axis "b" as show in FIGS. 11A through 11C. Members other than the air-bag 12 are not shown in FIGS. 9 to 11. Also, it should be noted that the term "axis" is employed in this specification to always cover both directions along the axis, i.e., a plus (+) "a" direction and a minus (−) "a" direction along the axis "a", unless otherwise indicated in the passages. However, the term "direction" used in this specification sometimes may also cover both directions along the axis. For instance, the term "vertical direction" is meant to cover an upward direction along the vertical axis and a downward direction along the vertical axis unless otherwise specified in the passages. For instance, the term "an upward direction" does not cover the downward direction along the vertical direction.

As shown in FIGS. 31A through 31F, the air-bag can be foloded in the following altenative method.

Figure 31A:
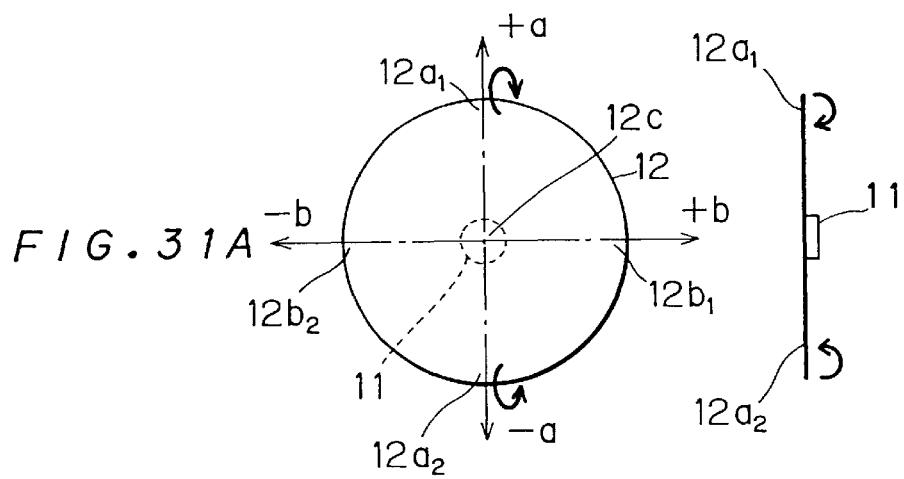
FIG. 31A through FIG. 31F are diagrams showing an alternate method of folding an air-bag step by step.
Figure 31B:
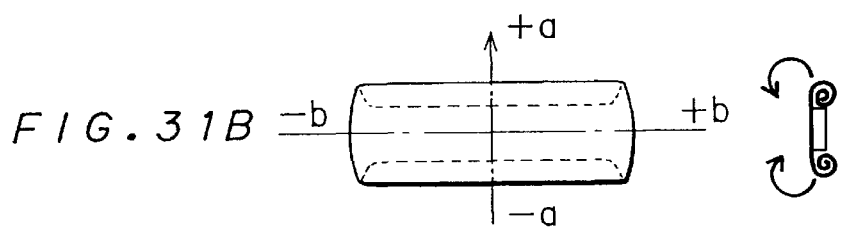

First of all, opposite ends 12a1, 12a2 of the air-bag 12 along a first axis "a" (corresponding to upward "+a" and downward "−a" directions in FIGS. 9 to 11) are rolled in towards its middle 12c on a side of the inflator 11 along the first axis "a" as shown in FIG. 31A and FIG. 31B.

Figure 31C:
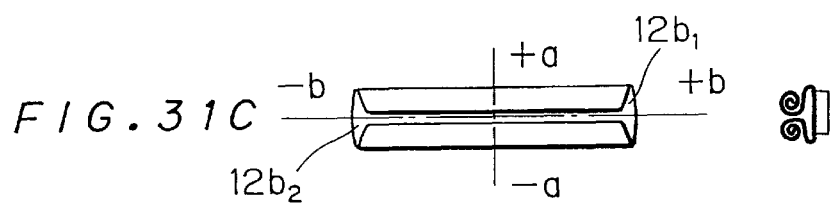

Then the rolled portions of the air-bag 12b shown in FIG. 31B are folded back in a direction opposite to the rolling direction with respect to a second axis "b" as shown in FIG. 31C.

Figure 31D:
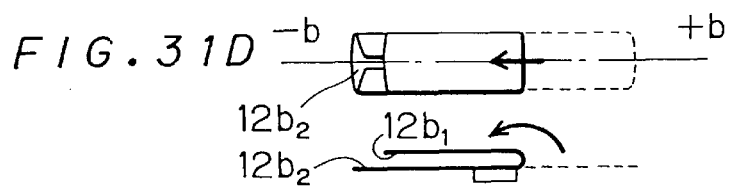
Figure 31E:
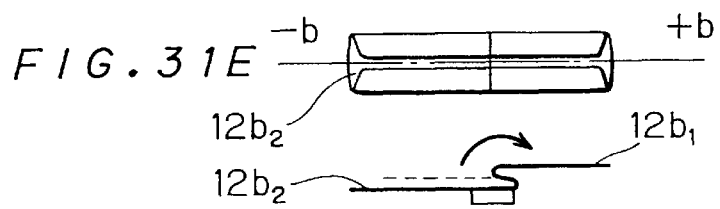
Figure 31F:
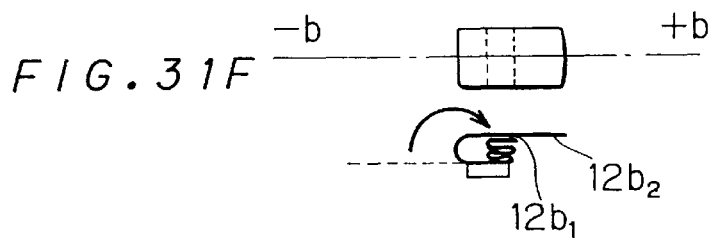

And then another opposite ends 12b1, 12b2 of the air-bag 12 along a second axis "b" (corresponding to leftward "−b" and rightward "+b" directions), perpendicular to the first axis "a", are folded in a zigzag manner one fold over another along the second axis "b" as show in FIGS. 31D, 31E, and 31F. Members other than the air-bag 12 are not shown in FIGS. 31A to 31F.

Figure 12:
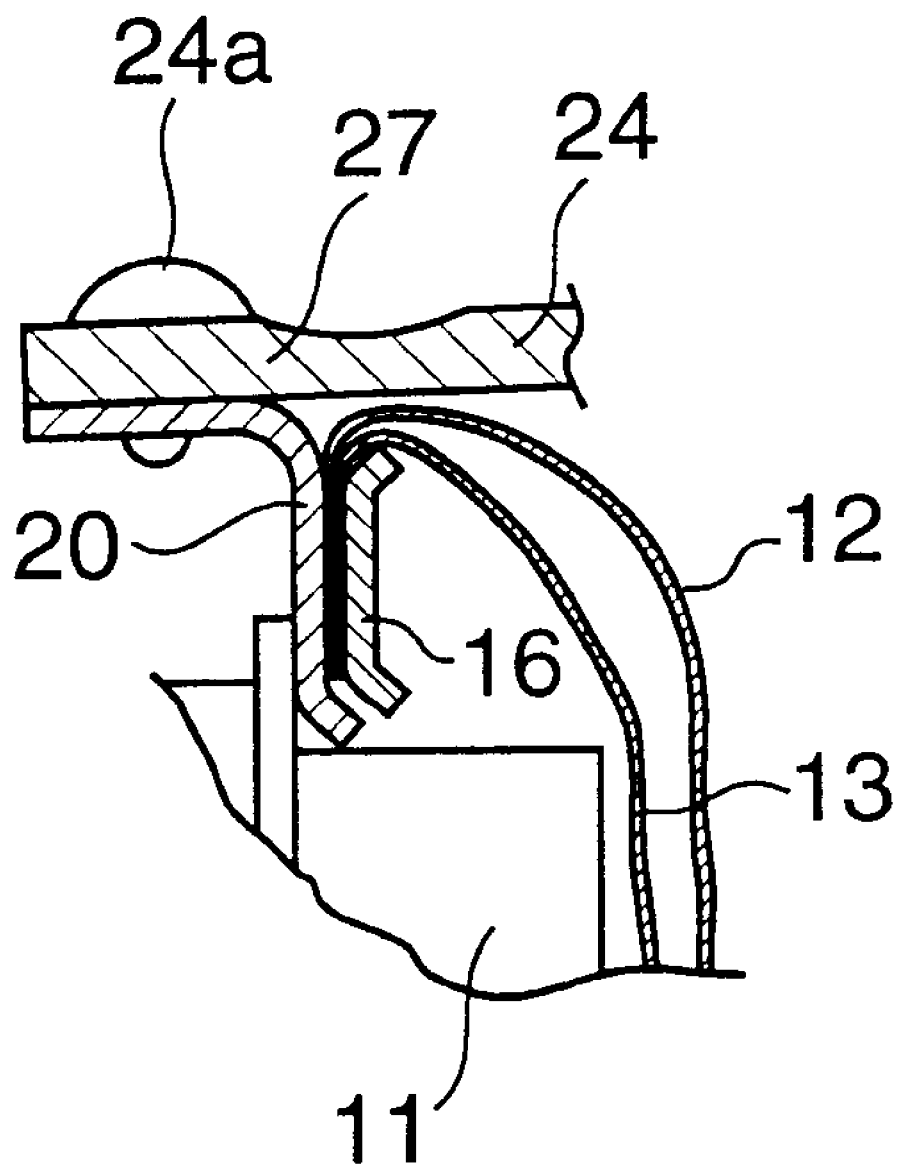
FIG. 12 is a section of an essential portion of the air-bag device.

The diffuser 13 is made of, for example, a fabric having no air permeability, and its base end is tightly held between the mount plate 20 and the pressing plate 16 while being located before the base end of the air-bag 12 as shown in FIG. 12. The diffuser 13 is inflated upon receiving the gas blown from the inflator 11 as shown in FIG. 13 while the air-bag 12 is being inflated. In this state, the diffuser 13 acts as a wall in front of the inflator 11 and a pair of openings 13a thereof are open to the left and right to thereby guide the gas blown from the inflator 11 in leftward and rightward directions.

The action and effects of this air-bag device 10 are described.

When the control box 5 detects a crash of the vehicle, power is applied to the inflator 11 of the air-bag device 10 from the driver of the control box 5. Thereupon, the gas generated by the inflator 11 is supplied to the air-bag 12, which is in turn expanded to split the cover member 21 open and is further rapidly inflated so as to receive a driver in the driver's seat 1 and protect him.

While the air-bag 12 is being inflated, the cover member 21 is split open along the splitting lines 35 to 37 upon action of a pressure from the expanding air-bag 12 on the cover member 21, thereby being split into the upper and lower cover sections 21A, 21B along the splitting lines 35 to 37. The upper cover section 21A is rotated upward by about 120° about the hinge 27 and the lower cover section 21B is rotated downward by about 90° about the hinge 27, with the result that the cover member 21 is split vertically open.

In this air-bag device 10, the air-bag 12 is folded in a zigzag manner one fold over another along the second axis "b" (leftward and rightward directions) which are perpendicular to the first axis "a" after being folded in the reverse roll-in method along the first axis "a" (upward and downward directions) from its opposite upper and lower ends toward its middle. Accordingly, the air-bag 12 is first transversely rapidly inflated, and then starts being vertically inflated. Since the zigzag folded portions of the air-bag 12 is rapidly inflated at an early stage of the inflation, the inflation can be speeded up at this early stage.

Although the air-bag 12 is slightly expanded toward the passenger while the zigzag folded portions thereof are transversely inflated at the early stage, it is unlikely to largely expand toward the passenger since being vertically folded in the reverse roll-in method, with the result that the air-bag 12 is likely to expand upward and downward. Therefore, an impact of the air-bag 12 being inflated on the passenger can be suppressed to a lower level.

Further, since the air-bag 12 is first inflated transversely, the passenger is prevented from being struck against a front pillar or the like by rapidly transversely inflating the air-bag 12 while preventing it from excessively expanding toward the passenger at the early stage of the inflation. Simultaneously, the air-bag 12 can excessively expand upward and downward. Furthermore, since the diffuser 13 for transversely diffusing the gas blown from the inflator 11 is provided, the expansion of the air-bag 12 in the transverse directions at the early stage of the inflation of the air-bag 12 is promoted, thereby preventing it from excessively expanding toward the passenger.

Further, since the cover member 21 for covering the front and outer circumferential surfaces of the air-bag 12 is split vertically open while the air-bag 12 is being inflated to substantially completely open the opposite lateral sides and the opposite vertical sides of the cover member 21. Accordingly, the air-bag 12 can be rapidly inflated in the vertical directions while being rapidly inflated in the transverse directions. In other words, the air-bag 12 can be smoothly rapidly inflated almost without being restricted by the cover member 21.

Since the upper and lower hinges 27, 28 which serve as the pivots when the cover member 21 is split open are provided near the base ends of the pair of connecting walls 24, 25, the upper and lower cover sections 21A, 21B of the split cover member 21 can pivot about the hinges 27, 28 to a large degree, thereby making it easier to open or expose the front and opposite lateral sides of the air-bag 12.

Since the connecting walls 24, 25 have no splitting lines formed therein, the rigidity thereof is not reduced, thereby ensuring a sufficient rigidity of the cover member 21. Further, since the base ends of the pair of side walls 26 of the cover member 21 are supported in contact with the front surface of the mount plate 20, respectively, the cover member 21 does not move backward even if the passenger pushes the cover member 21 by hand, thereby providing a solid quality and a reliability.

Further, since the plurality of the engaging portions 30, 32 formed in the cover member 21 are engaged with the covering portions 6a, 7a of the plurality of steering spokes 6, 7, the cover member 21 can be more restrictively positioned on the steering wheel 2. Furthermore, the mutual interference of the engaging portions 30, 32 with the covering portions 6a, 7a when the cover member 21 is split can be eased by the thinned portions 31, 33 as the interference easing portions provided in the respective engaging portions 30, 32. The construction of the interference easing portions can be simplified since the respective interference easing portions are realized by the thinned portions 31, 33 provided in the engaging portions 30, 32.

Next, a modification of the air-bag device 10 for the driver's seat 1 is described. Basically, the same elements as those of the above embodiment are identified by the same reference numerals.

Figure 14:
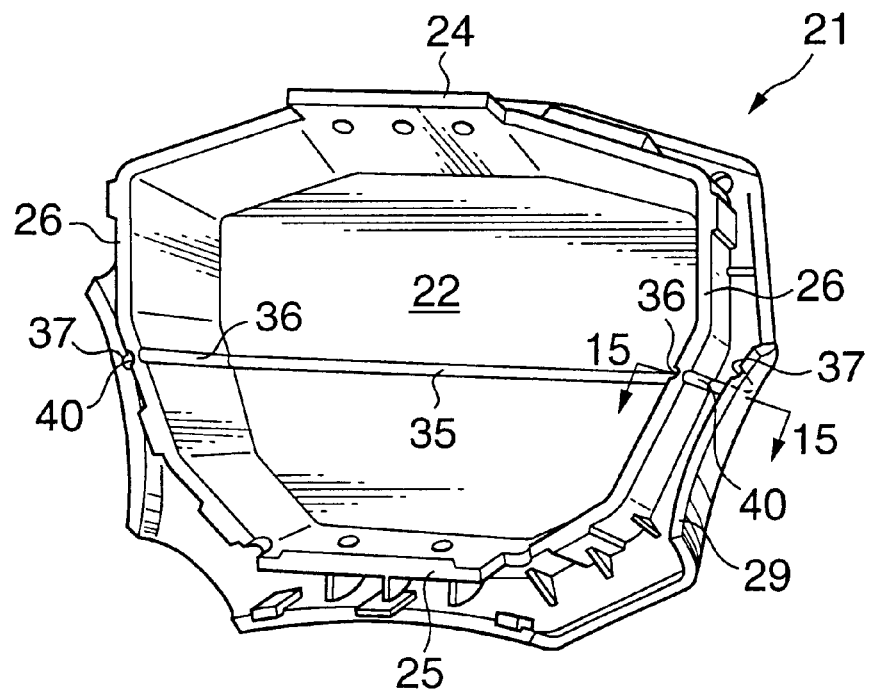
FIG. 14 is a perspective view of a cover member according to a modification when viewed from bottom.
Figure 15:
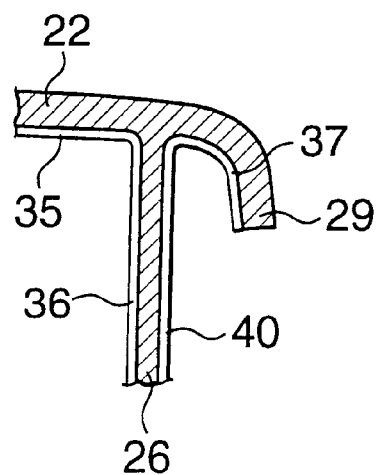
FIG. 15 is a section along 15—15 of FIG. 14.

1) As shown in FIGS. 14 and 15, splitting lines 40 may be formed in the respective side walls 26 by forming grooves, which extend along the splitting lines 36, on the opposite surfaces of the side walls 26 where the splitting lines 36 are formed.

Figure 16:
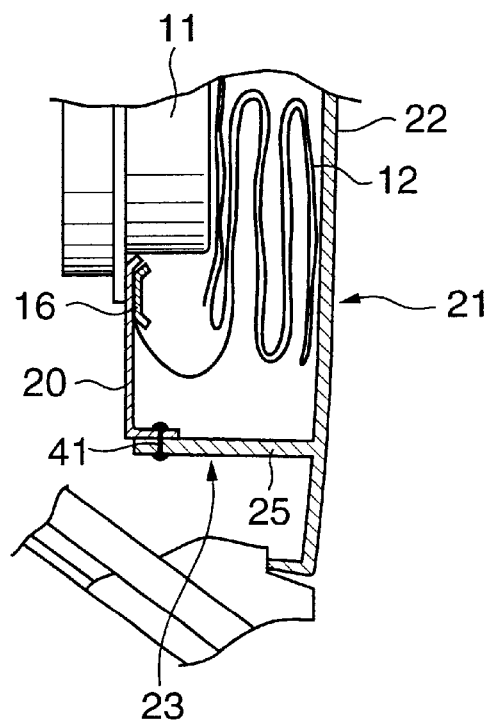
FIG. 16 is a section of an essential portion of a cover member according to another modification.

2) As shown in FIG. 16, the base ends of the respective side walls 26 may be connected with the mount plate 20 by a pin member 41 which is to be broken when the cover member 21 is split open. As a result, the base ends of the side walls 26 can be fixed to the mount plate 20 with an enhanced strength.

Figure 17:
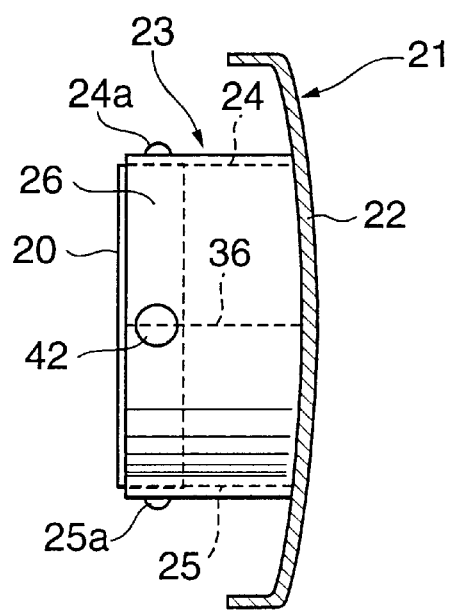
FIG. 17 is a side view of an essential portion of a cover member according to still another modification.

3) As shown in FIG. 17, the base ends of the respective side walls 26 may be connected with the mount plate 20 by rivets 42 extending across the splitting lines 36. Then, the base ends of the side walls 26 can be fixed to the mount plate by the rivets 42 with an enhanced strength without causing any problem in splitting the cover member 21 open since the rivets 42 extend across the splitting lines 36.

4) Instead of the thinned portions 31, 33, slits may be formed in the engaging portions 30, 32 as the interference easing portions.

5) The base ends of the side walls 26 may be held in contact with a member other than the mount plate 20.

6) Instead of the splitting lines 36, slits extending substantially along forward/backward directions may be formed in the side walls 26.

7) The diffuser 13 may be dispensed with. Since the air-bag 12 is transversely folded in a zigzag manner one fold over another after being vertically folded from its opposite upper and lower ends toward its middle in the reverse roll-in method, and is then accommodated in the container casing 14, the action and effects similar to those of the above embodiment during the inflation are obtained as can be seen from experiments described later.

Next, the air-bag device 50 for a passenger's seat 3 is described.

Figure 18:
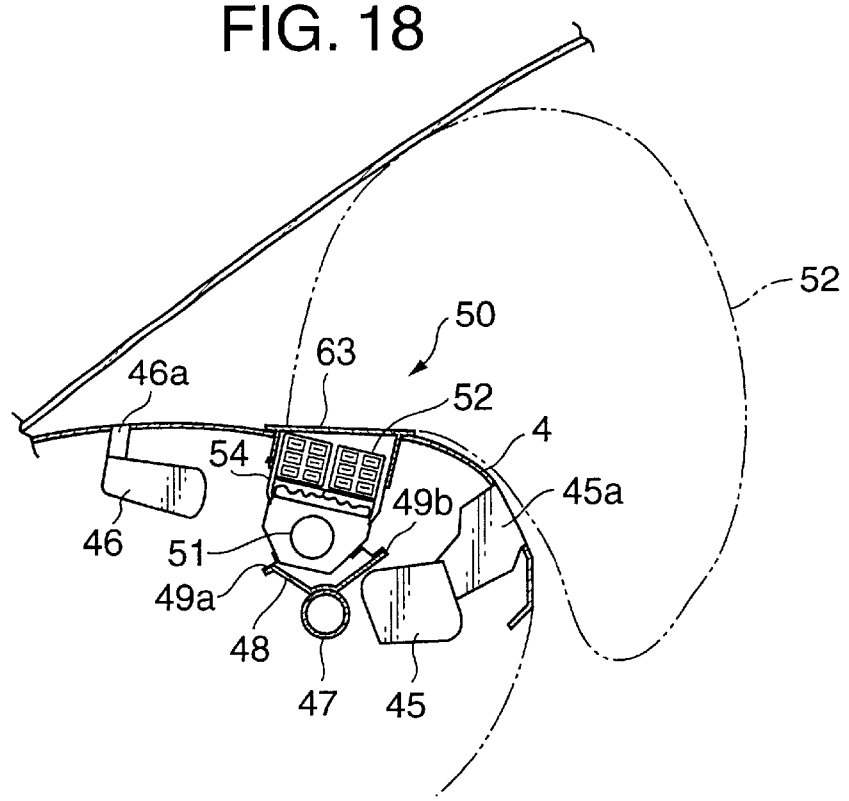
FIG. 18 is a vertical section of a dashboard including an air-bag device for a passenger's seat.

As shown in FIG. 18, a front air-conditioning duct 45 and a rear air-conditioning duct 46 are provided inside the dashboard 4, and a container casing 54 of the air-bag device 50 is fixed to a mount member 48 secured to a pipe-shaped inner panel member 47 via brackets 49a, 49b between the airconditioning ducts 45 and 46. The dashboard 4 is formed with air openings 45a, 46a in communication with the air-conditioning ducts 45, 46.

Figure 19:
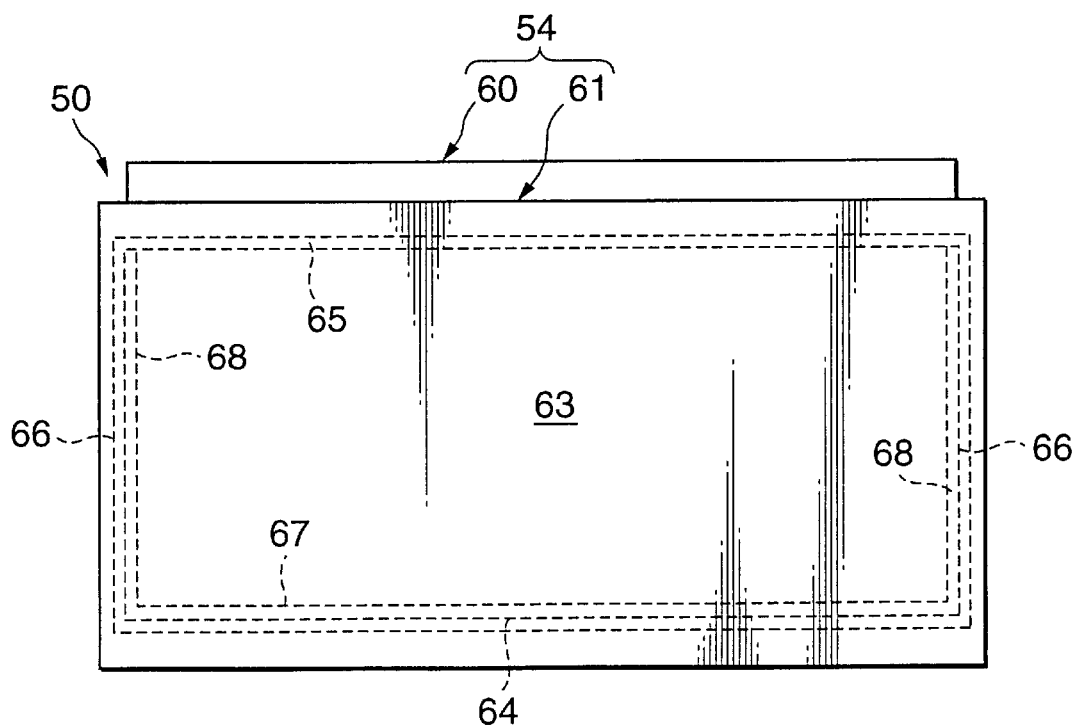
FIG. 19 is a plan view of an air-bag device.
Figure 20:
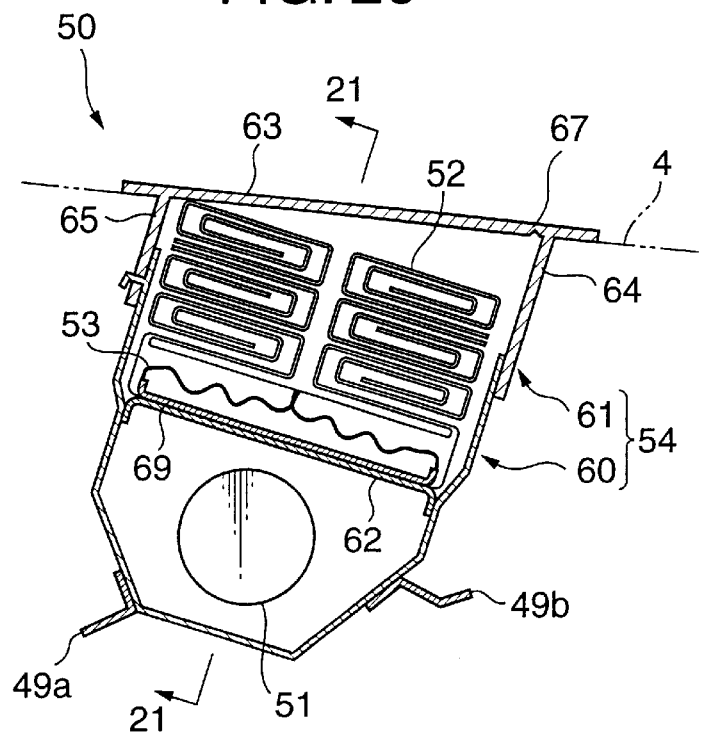
FIG. 20 is a vertical section of the air-bag device.
Figure 21:
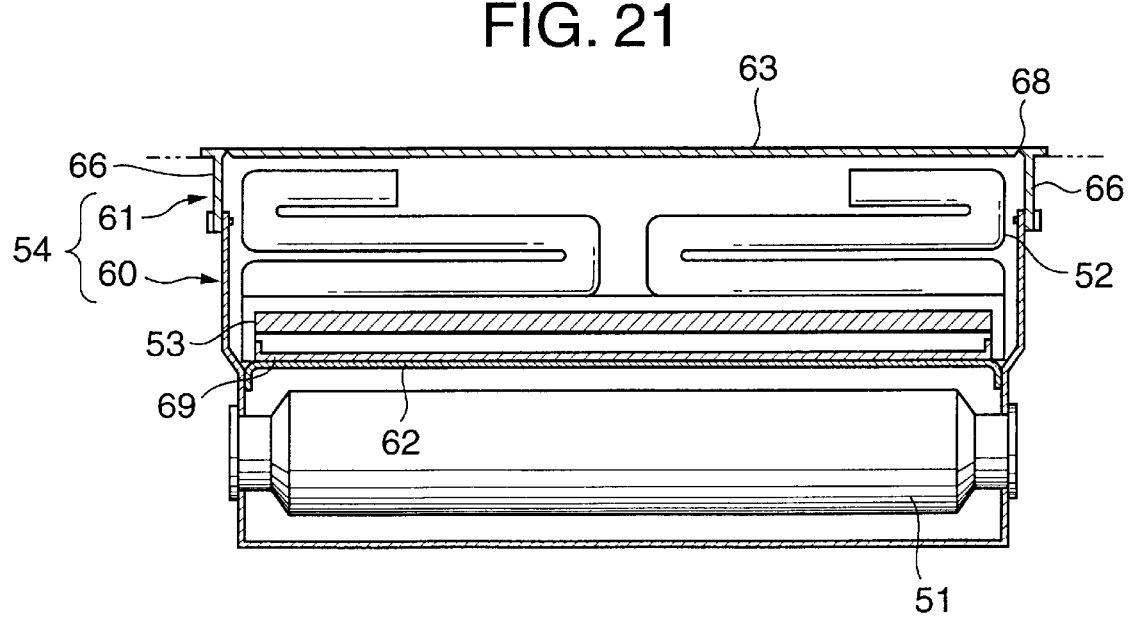
FIG. 21 is a section along 21—21 of FIG. 20.

As shown in FIGS. 19 to 21, the air-bag device 50 is provided with an inflator 51, an air-bag 52 which is inflated by a gas supplied from the inflator 51, a diffuser 53 (diffusing member) for transversely guiding (diffusing) the gas blown from the inflator 51, and the container casing 54 for accommodating the inflator 51, the air-bag 52 and the diffuser 53.

The container casing 54 is comprised of a transversely long metal casing member 60 fixedly mounted on the mount member 48 via the brackets 49a, 49b, and a cover member 61 made of a synthetic resin which covers the upper surface of the air-bag 52 and is split open when air-bag 52 is inflated. A transversely long and substantially rectangular partitioning plate 62 is secured in the middle of the inside of the casing member 60 with respect to vertical direction, and the inflator 51 is accommodated below the partitioning plate 62 and the air-bag 52 and the diffuser 53 are accommodated above the partitioning plate 62 while being folded in the container casing 54.

The cover member 61 includes an upper wall 63 facing the ceiling surface of the dashboard 4, and side walls 64 to 66 which are continuous with the upper wall 63. A bottom end of the cover member 61 is fitted on a top portion of the casing member 60. For example, the front and rear side walls 64, 65 are engaged with the casing member 60, and the left and right side walls 66 are connected with the casing member 60 by rivets.

The upper wall 63 is formed in its inner surface with a splitting line 67 which extends along the front side wall 64 and with a pair of splitting lines 68 which extend along the left and right side walls 66. While the air-bag 52 is being inflated, the cover member 61 is split along the splitting lines 67, 68 and the upper wall 63 is turned up backward about one side thereof still fixed, thereby being split open. It should be noted that these splitting lines 67, 68 are realized by forming grooves in the lower surface of the upper wall 63.

The inflator 51 is, for example, constructed by containing a gas generating agent in a transversely extending tubular case, and the opposite ends thereof are, for example, hermetically fitted and secured in mount holes formed in a side wall of the container casing 60. When the control box 5 detects a crash of the vehicle, power is applied to the inflator 51 from a driver of the control box 5, causing a reaction of the gas generating agent to generate a gas for inflating the air-bag 52. It should be noted that a plurality of gas openings (not shown) through which the generated gas is blown are formed in the outer wall of the tubular casing.

Figure 22:
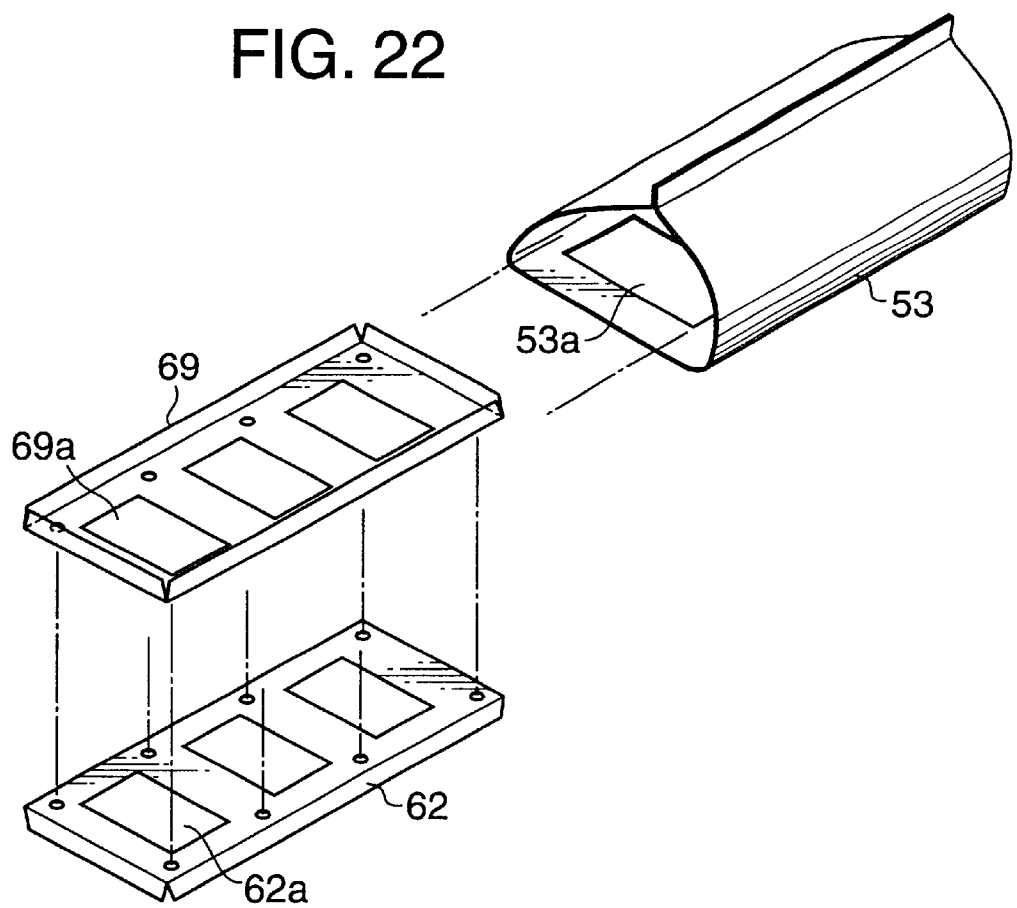
FIG. 22 is an exploded perspective view of an essential portion of the air-bag device.

The air-bag 52 is formed by sewing the outer edges of a pair of substantially rectangular fabric materials together, such that its vertical dimension is longer than its horizontal dimension in its inflated state. A base end of the air-bag 52 is tightly held between the partitioning plate 62 and a pressing plate 69 near their outer edges together with the diffuser 53. In this state, the air-bag 52 and the diffuser 53 are folded and accommodated. As shown in FIG. 22, three openings 62a, 69a are respectively formed in the partitioning plate 62 and the pressing plate 69 for introducing the gas blown from the inflator 51 into the air-bag 52. It should be noted that members including the air-bag 52 are not shown in FIG. 22.

Figure 23:
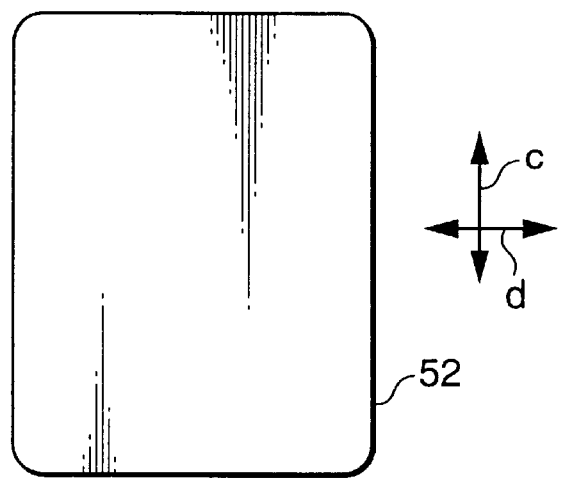
FIG. 23 is a development of an air-bag.
Figure 24:
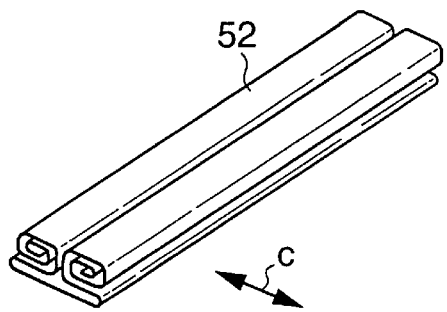
FIG. 24 is a perspective view of the air-bag (transversely folded state)
Figure 25:
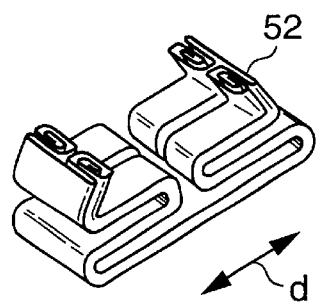
FIG. 25 is a perspective view of the air-bag (vertically folded state)

How the air-bag 52 is folded is described. The air-bag 52 is designed to vertically expand after transversely expanding while being inflated. The substantially rectangular air-bag 52 of FIG. 23 is folded in a zigzag manner one fold over another along directions "d" (leftward and rightward directions) as shown in FIG. 25 after being folded in the reverse roll-in method along directions "c" corresponding to upward and downward directions as shown in FIG. 24. Members other than the air-bag 52 are not shown in FIGS. 23 to 25.

Figure 26:
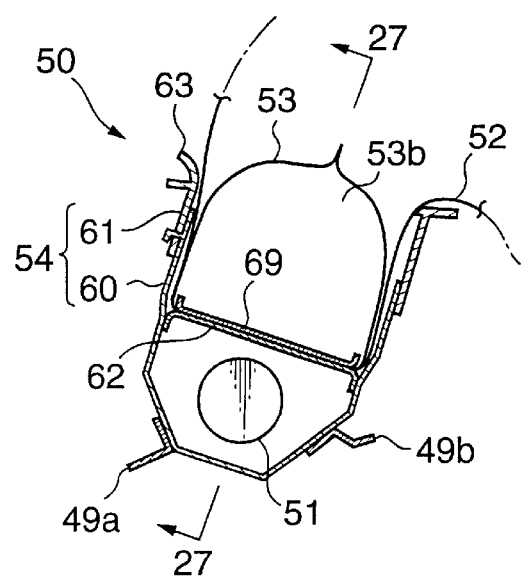
FIG. 26 is a vertical section of the air-bag device (inflated state)
Figure 27:
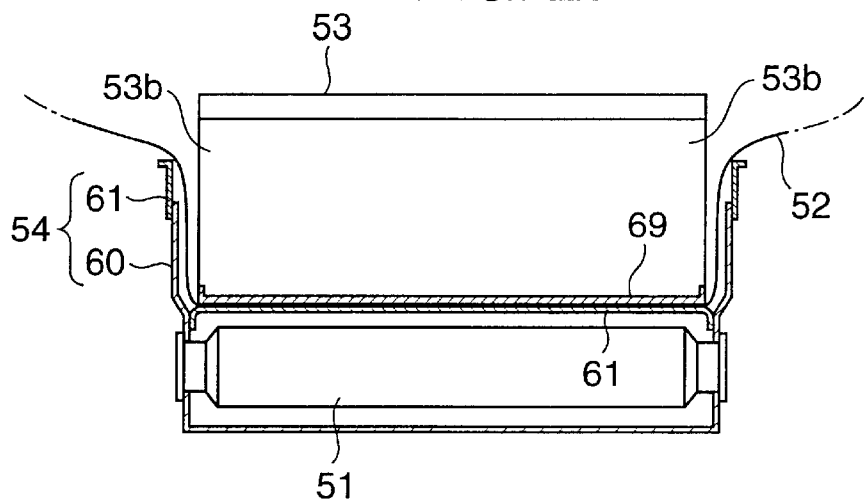
FIG. 27 is a section along 27—27 of FIG. 26.

The diffuser 53 is made of, for example, a rectangular fabric having no air permeability and having its opposite ends sewed together as shown in FIGS. 22, 26 and 27, and its base end is tightly held between the partitioning plate 62 and the pressing plate 69 above the base end of the air-bag 52. The diffuser 53 is inflated upon receiving the gas blown from the inflator 51 when the air-bag 52 is inflated. In this state, the diffuser 53 acts as a wall above the inflator 51 and a pair of openings 53a thereof are open to the left and right to thereby guide (diffuse) the gas blown from the inflator 51 in leftward and rightward directions. It should be noted that the diffuser 53 is formed with openings 53b corresponding to the openings 62a, 69a of the partitioning plate 62 and the pressing plate 69.

The action and effects of this air-bag device 50 are described.

When the control box 5 detects a crash of the vehicle, power is applied to the inflator 51 of the air-bag device 50 from the driver of the control box 5. Thereupon, the gas generated by the inflator 51 is supplied to the air-bag 52, which is in turn expanded to split the cover member 21 open and is further rapidly inflated so as to receive a passenger in the assistant driver's seat 3 and protect him.

While the air-bag 52 is being inflated, the cover member 61 is split open along the splitting lines 67, 68 upon action of a pressure from the expanding air-bag 52 on the cover member 61, with the result that the three sides of the upper walls 63 of the cover member 61 are separated from the corresponding side walls 64 to 65 along the splitting lines 67, 68 and the upper wall 63 is turned up backward about its remaining side still being fixed to the corresponding side wall 65.

In this air-bag device 50, the air-bag 52 is folded in a zigzag manner one fold over another along the directions "d" (leftward and rightward directions) which are perpendicular to the directions "c" after being folded in the reverse roll-in method along directions "c" (upward and downward directions) from its opposite upper and lower ends toward its middle, and accommodated in the container casing 54. Accordingly, the air-bag 52 is first transversely rapidly inflated, and then starts being vertically inflated. Since the zigzag folded portions of the air-bag 52 are rapidly inflated at an early stage of the inflation, the inflation can be speeded up at this early stage.

Although the air-bag 52 is slightly expanded toward the passenger while the zigzag folded portions thereof are transversely inflated at the early stage, it is unlikely to excessively expand toward the passenger since being vertically folded in the reverse roll-in method along its vertical dimension which is longer than its horizontal dimension, with the result that the air-bag 52 is likely to expand upward and downward. Therefore, an impact of the air-bag 52 being inflated on the passenger can be suppressed to a lower level.

Further, since the air-bag 52 is first inflated transversely, the passenger is prevented from being struck against a front pillar or the like by rapidly transversely inflating the air-bag 52 while preventing it from excessively expanding toward the passenger at the early stage of the inflation. Simultaneously, the air-bag 52 can be largely inflated upward and downward. Furthermore, since the diffuser 53 for transversely diffusing the gas blown from the inflator 51 is provided, the expansion of the air-bag 52 in the transverse directions at the early stage of the inflation of the air-bag 52 is promoted, thereby preventing it from excessively expanding toward the passenger.

Since the air-bag device 50 is installed in the upper surface of the dashboard 4 and the vertical dimension of the air-bag 52 is longer than the horizontal dimension thereof in its inflated state, it can be suitably folded in the reverse roll-in method from its vertical opposite ends toward its middle. In other words, the air-bag 52 of the air-bag device 50 for the assistant driver's seat can be rapidly inflated.

The inventors of the present invention conducted experiments in which a plurality of air-bag devices having air-bags folded in various manners were prepared and a degree of impact on a passenger when the air-bag is inflated in the respective air-bag devices was measured using a dummy. It should be noted that the plurality of air-bag devices have the same construction except how they are folded and all the impact measurement tests were conducted under the same conditions.

As a comparative example was prepared an air-bag device in which, for example, an air-bag is transversely folded in the reverse roll-in method from its left and right ends toward its middle after being folded in the reverse roll-in method from its upper and lower ends toward its middle in directions corresponding to the vertical direction of the air-bag in its inflated state, and then accommodated in a container casing. A measurement result for the comparative example is as shown in section [I] of a graph of FIG. 28, and the one for the inventive air-bag device 50 is as shown in section [II] of the graph of FIG. 28. In section [III] of the graph of FIG. 28 is shown a measurement result for an air-bag device according to a modification to be described alter (the diffuser 53 is eliminated from the construction of the air-bag device 50).

Figure 28:
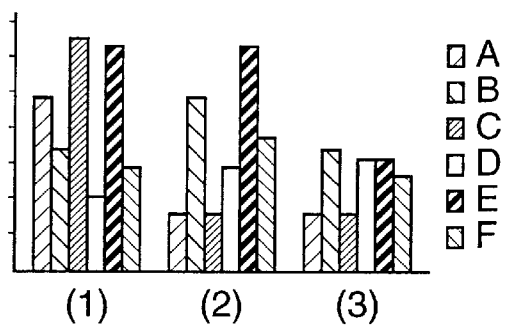
FIG. 28 is a graph showing measurement results of degrees of impact of a crash.
Figure 29:
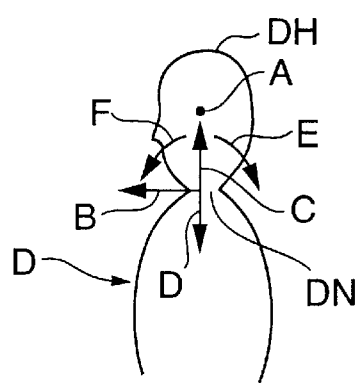
FIG. 29 is a diagram showing load measuring positions and directions on a dummy.

In FIG. 28, A denotes a degree of impact which acts on a head DH of a dummy D, and B to F denote degrees of impact which acts on a neck DN of the dummy K in directions of arrows B to F. Although measurement results for air-bag devices in which air-bags are accommodated while being folded in other conventional manners are not shown, they were, as a whole, substantially the same as those shown in section [I] of FIG. 28 for the air-bag device of the comparative example.

Figure 30:
FIG. 30 is a diagram showing an on-going inflated state of an air-bag recorded at intervals of a short period.

The prior art air-bag device (section [I] of the graph of FIG. 28) has a problem of a large degree of impact on the passenger as a whole. Contrary to this, the degree of impact on the passenger can be collectively reduced as is clear from a comparison of section [I] of FIG. 28 with section [III] of FIG. 28. The degree of impact on the head DN was proved to be remarkably reduced. Further, as a result of successively photographing an on-going inflated state of the air-bag 52 every 5 msec. as shown in FIG. 30, the inflation was proved to almost complete after 35 msec. following the start thereof (following the detection of a crash), i.e. the air-bag 52 was proved to securely and rapidly inflate.

Similar impact measurement tests and a similar experiment of recording an on-going inflated state were conducted for the air-bag device 10 for the driver's seat. Although not shown, the air-bag device 10 could provide substantially the same performances as the air-bag device 50 for the assistant driver's seat.

The diffuser 53 may be dispensed with. A degree of impact on the passenger of the air-bag device having no diffuser 53 can be collectively reduced, particularly, a degree of impact on the head is remarkably reduced as is clear from a comparison of section [II] of FIG. 28 with section [I] of FIG. 28.

To sum up the invention described in the foregoing paragraphs, this invention relates to an air-bag device that comprises: an inflator: an air-bag to be inflated by a gas supplied from the inflator; and a cover member adapted for covering front sides of the inflator and the air-bag and to be split open upon inflation of the air-bag, said air-bag is accommodated under the cover member in such a folded state that: (1) opposite ends of the air-bag along a first axis are folded towards its middle along the first axis and are rolled in a direction opposite to the folding direction along the first axis, and (2) opposite ends of the air-bag along a second axis, perpendicular to the first axis, are folded in a zigzag manner one fold over another along the second axis.

With the above described device, the inflator is activated, at the time of a car crush, to generate a gas and the gas is supplied to the air-bag to inflate the air-bag. Since the air-bag is accommodated under the cover member in a folded state in the manner described in the above passage, the air-bag is first rapidly inflated along the second axis and thereafter it starts to be inflated along the first axis. In the early expansion stage of the air-bag, the portion folded in the zigzag manner as described in the above is rapidly inflated along the secong axis, facilitating the initial expansion speed of the air-bag. When the air-bag is being inflated along the second axis in the early expansion stage, the air-bag is expanded to the driver (or passenger) side, i.e., along the first axis. However, since the air-bag is in a reverse roll-in state along the first axis, the expansion of the air-bag along the first axis is more resisted than that along the second axis. As a result, the air-bag is resisted to be expanded towards the driver (or passenger) thereby enabling to alleviate an impact force generated by the expansion of the air-bag on the driver (or passenger).

In the above described device, the first and second axis preferably correspond to substantially vertical and transverse directions in an inflated state of the air-bag, respectively.

Since the first axis substantially corresponds to the vertical direction and the second axis substantially corresponds to the transverse direction, in the initial expansion stage of the air-bag, the expansion speed towards a driver (or a passenger) is restricted, i.e., avoiding an excessive speed, but the expansion speed along the transverse direction (leftward and rightward) is not restricted, i.e., a rapid expansion along the transverse direction is secured. As a result, it can prevent the driver (or the passenger) from colliding with a front pillar and the like as a secondary collision.

The above described device may further comprises a diffusing member for diffusing the gas blown from the inflator along the second axis.

With the above feature, the gas blown from the inflator is diffused along the second axis by the diffusing member. Thus in the initial expansion stage of the air-bag, the expansion of the air-bag along the second axis is promoted but the expansion along the first axis, i.e., towards the driver (or passenger) is suppressed to a lower level.

In the above device, the air-bag may be set longer along the first axis than along the second axis. With this feature, the air-bag is folded in a reverse roll in state along the first axis, along which the air-bag is longer in dimension, it is even more preferable to suppress the expansion speed towards the driver (or passenger). In addition, when the air-bag is provided on the upper surface of a dashboard, as the expanded dimension of the air-bag along the vertical direction is longer, thus the first axis should be corresponding to the vertical direction of the air-bag when expanded.

Another aspect of this invention is directed to an air-bag device that comprises: an inflator, an air-bag to be inflated by a gas supplied from the inflator, the air-bag being accommodated by, after being folded along a first axis, being folded along a second axis perpendicular to the first axis, a cover member adapted to cover the front sides of the inflator and the air-bag and to be split open during the inflation of the air-bag, wherein the air-bag is longer along the first axis than along the second axis.

With the above described device, when the air-bag begins to inflate, the folded portion of the air-bag along the second axis is expanded and just around the same time the folded portion of the air-bag along the first axis is expanded. Where, in this device, the folding methods of the air-bag along the first and the second axis are not specifically defined. However, the length of the air-bag along the first axis is set longer than that along the second axis, accordingly, the air-bag is folded along the longer dimension direction first, thus the air-bag expansion along the second axis is more easily carried out. Furthermore, the air-bag of this structure is preferably, but not limited thereto, for a passenger side air-bag and the first axis should correspond to the vertical direction (upward and downward directions) when expanded.

When the above device is used for the passenger side and is provided on an upper surface of the dashboard, the air-bag's dimension along the vertical direction needs to be set longer than that in the transverse direction, thus it is preferred to have the air-bag with the above feature, i.e., a length along the first axis is different from that along the second axis.

According to the present invention, an air-bag folding method for folding an air-bag, which can be inflated by a gas supplied from an inflator of an air-bag device, in a container casing, the method comprises the following steps:

First, (i) folding opposite ends of the air-bag along a first axis towards its middle along the first axis; then (ii) rolling said opposite ends of the air-bag in a direction opposite to the folding direction along the first axis, and then (iii) folding opposite ends of the air-bag along a second axis, perpendicular to the first axis, in a zigzag manner, one fold over another, towards its middle along the second axis.

Since the air-bag is folded in a zigzag manner along the second axis which is perpendicular to the first axis, when the air-bag is expanded, the air-bag is first expanded along the second axis, and thereafter, the air-bag is expanded along the first axis. As the portion of the air-bag folded in a zigzag manner is rapidly expanded, the initial expansion speed is increased. Though the air-bag is expanded towards the driver (or passenger) when the zigzag folded portion of the air-bag expands along the second axis, the expansion speed towards the driver (along the first axis) is suppressed to a lower level. Because the air-bag is folded in a reverse roll in state along the first axis, the air-bag is resisted to be expanded towards the driver (or passenger). When the reverse roll in portion of the air-bag is expanded along the first axis, it is likely that the air-bag is expanded towards opposite external sides thereof.

The air-bag folded according to the above method, the first and second axis preferably correspond substantially to vertical and transverse directions in an inflated state of the air-bag, respectively.

With the above feature, the air-bag is first expanded along the transverse direction (leftward and rightward) and thereafter it is expanded along the vertical direction (upward and downward directions). Though the air-bag is expanded towards the driver (or passenger) when it is being expanded along the transverse direction, the expansion speed of the air-bag towards the driver is suppressed to a lower level. Because the air-bag is folded in a reverse roll in state along the vertical direction, the air-bag is resisted to be expanded towards the driver (or passenger). When the reverse roll in portion of the air-bag is expanded along the vertical direction, it is likely that the air-bag is expanded towards opposite external sides thereof.

This application is based on patent application No. 11-98879 filed in Japan on Apr. 6, 1999 and the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An air-bag device provided in a steering wheel including a bottom wall portion, steering wheel spokes and a main body, the air bag being positioned in an area enclosed by the bottom wall portion, the steering wheel spokes and the main body and comprising:

an inflator;

an air-bag inflated by a gas supplied from the inflator; and a cover member for covering front sides of the inflator and the air-bag and to be split open upon inflation of the air-bag, the cover member including a front wall portion covering a front surface and outer circumferential surface of the air-bag and a surrounding wall portion continuously formed with said front wall portion and has a first splitting line extending in a middle position on a rear surface of the cover member along a first direction and over opposite ends of the front wall portion along a second direction and a second splitting line on the surrounding wall portion continuously formed with the front wall portion along the second direction with the second splitting line extending from an end of said first splitting line substantially towards a frontward direction;

said air-bag is accommodated under the cover member in such a folded state that:

(1) opposite ends of the air-bag along a first axis are folded towards its middle along a first axis and are rolled in a direction opposite to the folding direction along the first axis, and (2) opposite ends of the air-bag along a second axis, perpendicular to the first axis, are folded in a zigzag manner one fold over another along the second axis.

2. The air-bag device of claim 1, further comprising a mount plate fixedly secured to the steering wheel for fixing the inflator, wherein the surrounding wall portion includes a first surrounding wall portion and a second surrounding wall portion, the first surrounding wall portion having a base and connected to the mount plate and the second surrounding wall portion is provided outside the first surrounding wall portion with respect to the air-bag and includes an engagement portion engaging the steering spokes, the second splitting line provided in a sidewall of the first surrounding wall extending from the first splitting line and the second surrounding wall includes a third splitting line extending in the front direction along with the second splitting line.

3. The air-bag device of claim 2, further comprising a fourth splitting line formed in an opposing side of the second sidewall from said second splitting line.

4. The air-bag device of claim 2, wherein said sidewall portion includes a base end connected to the mount plate.

5. The air-bag device of claim 4, wherein the base end of the sidewall portion is connected to the mount plate by a rivet extending through the second splitting line.

6. The air-bag device of claim 2, further comprising an interference easing portion formed in said second surrounding wall portion for easing interference of the engaging portion with the steering spokes when the cover member is split along the second splitting line.

7. The air-bag device of claim 6, wherein the interference easing portion is formed in a thinned portion of the engaging portion.

8. The air-bag device of claim 6, wherein the interference easing portion is formed in a recessed portion of the engaging portion.

9. The air-bag device of claim 1, further comprising a diffusion member for diffusing the gas blow from the inflator along the second axis.

10. The air-bag device of claim 1, wherein the first and second axis substantially correspond to vertical and transverse directions in an inflated state of the air-bag, respectively.

11. The air-bag device of claim 2, further comprising a diffusion member for diffusing the gas blow from the inflator along the second axis.

12. The air-bag device of claim 2, wherein the first and second axis substantially correspond to vertical and transverse directions in an inflated state of the air-bag, respectively.

13. An air-bag device for a vehicle provided in a steering wheel including a bottom wall portion, steering wheel spokes and a main body, the air bag being positioned in an area enclosed by the bottom wall portion, the steering wheel spokes and the main body and comprising:

an inflator, an air-bag inflated by a gas supplied from the inflator, the air-bag being accommodated by, after being folded along a first axis, being folded along a second axis perpendicular to the first axis, a cover member for covering the front sides of the inflator and the air-bag and to be split open during the inflation of the air-bag, the air-bag being longer along the first axis than along the second axis, the cover member including a front wall portion covering a front surface and outer circumferential surface of the air-bag and a surrounding wall portion continuously formed with said front wall portion and has a first splitting line extending in a middle position on a rear surface of the cover member along a first direction and over opposite ends of the front wall portion along a second direction and a second splitting line on the surrounding wall portion continuously formed with the front wall portion along the second direction with the second splitting line extending from an end of said first splitting line substantially towards a frontward direction; and a diffusion member for diffusing the gas blown from the inflator along a direction transverse to a length of the vehicle.

14. The air-bag device of claim 13, further comprising a mount plate fixedly secured to the steering wheel for fixing the inflator, wherein the surrounding wall portion includes a first surrounding wall portion and a second surrounding wall portion, the first surrounding wall portion having a base and connected to the mount plate and the second surrounding wall portion is provided outside the first surrounding wall portion with respect to the air-bag and includes an engagement portion engaging the steering spokes, the second splitting line provided in a sidewall of the first surrounding wall extending from the first splitting line and the second surrounding wall includes a third splitting line extending in the front direction along with the second splitting line.

15. The air-bag device of claim 14, further comprising a fourth splitting line formed in an opposing side of the second sidewall from said second splitting line.

16. The air-bag device of claim 14, wherein said sidewall portion includes a base and connected to the mount plate.

17. The air-bag device of claim 16, wherein the base end of the sidewall portion is connected to the mount plate by a rivet extending through the second splitting line.

18. The air-bag device of claim 14, further comprising an interference easing portion formed in said second surrounding wall portion for easing interference of the engaging portion with the steering spokes when the cover member is split along the second splitting line.

19. The air-bag device of claim 18, wherein the interference easing portion is formed in a thinned portion of the engaging portion.

20. The air-bag device of claim 19, wherein the interference easing portion is formed in a thinned portion of the engaging portion.

21. The air-bag device of claim 13, wherein the first and second axis substantially correspond to vertical and transverse directions in an inflated state of the air-bag, respectively.

22. The air-bag device of claim 14, further comprising a mount plate fixedly secured to the steering wheel for fixing the inflator, wherein the surrounding wall portion includes a first surrounding wall portion and a second surrounding wall portion, the first surrounding wall portion having a base and connected to the mount plate and the second surrounding wall portion is provided outside the first surrounding wall portion with respect to the air-bag and includes an engagement portion engaging the steering spokes, the second splitting line provided in a sidewall of the first surrounding wall extending from the first splitting line and the second surrounding wall includes a third splitting line extending in the front direction along with the second splitting line.

* * * * *